United States Patent
Mardiks

(10) Patent No.: US 8,140,064 B2
(45) Date of Patent: *Mar. 20, 2012

(54) METHODS AND APPARATUS TO USE AN IDENTITY MODULE IN TELECOMMUNICATION SERVICES

(75) Inventor: Eitan Mardiks, Ra'anana (IL)

(73) Assignee: SanDisk IL Ltd., Kfar Saba (IL)

( * ) Notice: Subject to any disclaimer, the term of this patent is extended or adjusted under 35 U.S.C. 154(b) by 534 days.

This patent is subject to a terminal disclaimer.

(21) Appl. No.: 12/128,638

(22) Filed: May 29, 2008

(65) Prior Publication Data

US 2009/0191918 A1     Jul. 30, 2009

Related U.S. Application Data

(63) Continuation-in-part of application No. 12/020,551, filed on Jan. 27, 2008.

(51) Int. Cl.
*H04M 3/00* (2006.01)
(52) U.S. Cl. .................. 455/419; 455/418; 455/558
(58) Field of Classification Search .......... 455/558, 455/418, 419
See application file for complete search history.

(56) References Cited

U.S. PATENT DOCUMENTS

| | | | |
|---|---|---|---|
| 5,557,679 A | 9/1996 | Julin et al. | |
| 7,828,208 B2 | 11/2010 | Gangi | |
| 2004/0198333 A1* | 10/2004 | Zanaty | 455/418 |
| 2005/0079863 A1 | 4/2005 | Macaluso | |
| 2005/0182802 A1* | 8/2005 | Beaudou et al. | 708/200 |
| 2005/0204041 A1* | 9/2005 | Blinn et al. | 709/225 |
| 2006/0253556 A1 | 11/2006 | Wallis et al. | |
| 2008/0051062 A1* | 2/2008 | Lee | 455/411 |
| 2009/0124287 A1 | 5/2009 | Weiss et al. | |
| 2009/0227290 A1 | 9/2009 | Chien | |

FOREIGN PATENT DOCUMENTS

| | | |
|---|---|---|
| EP | 0562890 A1 | 9/1993 |
| EP | 0920684 A1 | 6/1999 |
| EP | 0981803 A1 | 3/2000 |
| GB | 2378097 A | 1/2003 |
| WO | 2005/074238 A1 | 8/2005 |

(Continued)

OTHER PUBLICATIONS

European Search Report, EP Application No. 09250191, dated Jun. 2, 2009, 7 pages.

(Continued)

*Primary Examiner* — Lewis West
(74) *Attorney, Agent, or Firm* — Toler Law Group, PC

(57) ABSTRACT

An identity module includes a memory and a processor. In the memory are stored installation code for installing in the memory a provider profile that associates the identity module with a communication services provider and communication code that, in combination with the provider profile, supports communication by a host of the identity module using services of the communication services provider. The processor executes the installation code to install the provider profile and then executes the communication code in support of the communication. Preferably, no portion of any such communication suite is stored initially in the identity module. The host requests the provider profile from a server that includes a communication interface for communicating with the host, a memory wherein is stored code for providing to the host a customization suite that includes substantially all of the provider profile, and a processor for executing the code.

20 Claims, 10 Drawing Sheets

FOREIGN PATENT DOCUMENTS

WO    2007/006535 A1    1/2007

OTHER PUBLICATIONS

European Search Report, EP Application No. 09250195, dated Jun. 22, 2009, 8 pages.
Communication Pursuant to Article 94(3)EPC dated Apr. 19, 2010 issued in European Patent Application No. 09250195.6, 5 pages.
Communication Pursuant to Article 94(3)EPC dated Apr. 21, 2011 issued in European Patent Application No. 09250195.6, 4 pages.
Non-Final Office Action mailed Nov. 19, 2010 in U.S. Appl. No. 12/128,641, 6 pages.
Non-Final Office Action mailed Dec. 21, 2010 in U.S. Appl. No. 12/020,551, 24 pages.
Final Office Action mailed Jul. 7, 2011 in U.S. Appl. No. 12/020,551, 22 pages.
Communication Pursuant to Article 94(3)EPC dated Sep. 29, 2011 issued in European Patent Application No. 09250195.6, 5 pages.

* cited by examiner

METHODS AND APPARATUS TO USE AN IDENTITY MODULE IN TELECOMMUNICATION SERVICES

This is a continuation-in-part of U.S. patent application Ser. No. 12/020,551, filed Jan. 27, 2008

This application is related to U.S. patent application Ser. No. 12/128,641 of the same inventors, which is entitled "METHOD OF RECRUITING A NEW SUBSCRIBER TO A COMMUNICATION SERVICES PROVIDER" and filed on the same day as the present application. The latter application, also claiming priority from U.S. patent application Ser. No. 12/020,551, is incorporated in its entirety as if fully set forth herein.

FIELD OF THE INVENTION

Various embodiments are related to a generic identity module that can be personalized after delivery to a user of a mobile telecommunications device in the course of subscribing to a provider of telecommunications services.

BACKGROUND

A mobile telecommunications device such as a cellular telephone generally has installed within it an identity module that identifies the user to the provider of telecommunications services to which the user of the device has subscribed Different telecommunications standards have different names for such an identity module, including: Subscriber Identity Module (SIM) in the GSM standard, Universal Integrated Circuit Card (UICC) in the UMTS standard, and Removable User Identity Module (RUIM) in the CDMA standard. The identity module has stored securely therein one or more digital strings that identify the device in which the identity module is installed with a subscriber of the telecommunications services' provider. In the case of a SIM card, these strings include a unique International Mobile Subscriber Identity (IMSI) and one or more 128-bit authentication keys (Ki).

Identity modules generally, and in particular the "generic" identity module disclosed herein, are discussed herein in terms of SIMs according to the GSM standard. However, it will be clear to those skilled in the art how to apply the principles disclosed herein to identity modules of other telecommunication standards.

FIG. 1 is a high level block diagram of a conventional SIM 10. SIM 10 includes a processor 12, an external interface 14, and three memories: RAM 16, ROM 18 and EEPROM 20, all communicating with each other via a bus 22. RAM 16 is used by processor 12 as a working memory, for execution of code 30 stored in ROM 18 and EEPROM 20. Data 24, such as a SIM file system 38, as well as an IMSI and one or more Ki's, that personalize SIM 10 and associate SIM 10 with a provider of telecommunication services, are stored in EEPROM 20.

FIG. 1 is a block diagram of a legacy SIM 10. High-capacity SIMs 10 have two interfaces 14, one for SIM functionality and the other for storage access.

FIG. 2 shows the hierarchical architecture of code 30 and its relationship to data 24. The lower layer of code 30 is an operating system 34 that includes a driver 32 of interface 14. (Operating system 34 of a high capacity SIM 10 would have two such drivers 32 for its two interfaces 14.) Optionally, operating system 34 also includes a JAVA virtual machine 40. Operating system 34 includes, inter alia, communications code that is executed by processor 12 in support of communication between the mobile telecommunications device, wherein SIM 10 is installed, and the telecommunications network of the provider that SIM 10 associates with the mobile telecommunications device. Above operating system 34 are SIM file system 38 and provider-specific JAVA applets 46. SIM file system 38 includes standard files 42 that are defined by the GSM standard and provider-defined files 44 that are specific to the provider. Some of standard files 42 and provider-defined files 44 are an electrical profile of SIM 10. FIG. 1 shows that code 30 is distributed between code portion 30A in ROM 18 and code portion 30B in EEPROM 20. JAVA applets 46 are considered herein to be a part of code 30 and are stored in EEPROM 20. The remaining part of code 30 is stored in ROM 18. File system 38 is stored in EEPROM 20.

A SIM manufacturer contracting with a telecommunications service provider to provide devices such as SIM 10, installs all of code 30 and data 24 in SIM 10. Each such SIM 10 has unique data 24 (e.g. a unique IMSI and one or more unique Ki's) that, after the telecommunications services provider provides the SIM 10 to a subscriber, identifies the telecommunications device in which that SIM 10 is installed as belonging to that subscriber.

Initially, before being associated with a specific telecommunications services provider, each SIM 10 is generic. It would be highly advantageous to be able to sell such generic SIMs directly to users, and have the SIMs be personalized for the users as part of the procedure by which the users subscribe to their selected telecommunications services providers. Such generic SIMs could be sold by vendors who are not associated with specific telecommunications providers.

SUMMARY OF THE INVENTION

Herein is presented an identity module including: (a) a memory wherein is stored: (i) executable installation code for installing, in the memory, a provider profile that associates the identity module with a communication services provider, and (ii) executable communication code that, in combination with the provider profile, supports communication, by a host to which the identity module is operationally coupled, using communication services provided by the communication services provider; and (b) a processor for executing the executable installation code to install the provider profile in the memory and for then executing the executable communication code for communication using the communication services provided by the communication services provider.

Herein is presented a server including: (a) a communication interface for communicating with a host that is operationally coupled to an identity module that, when provided with a provider profile that associates the identity module with a communication services provider, supports communication services provided by the communication services provider; (b) a memory wherein is stored executable installation code for providing, to the host, a customization suite that includes substantially all of the provider profile; and (c) a processor for executing the executable installation code.

A basic generic identity module includes a memory bearing executable installation code, executable communication and a processor for executing the executable installation code and the executable communication code. The executable installation code is for installing, in the memory, a provider profile that associates the identity module with a communication services provider. The executable communication code, in combination with the provider profile, supports communication, by a host to which the identity module is operationally coupled, using communication services provided by the communication services provider. The processor is for executing the executable installation code to install the provider profile in the memory and then executing the executable communication code for communication using the communication services provided by the communication services provider. Preferably, no portion of any such provider profile is stored initially in the identity module. Hence, there is nothing stored in the identity module, not even a temporary IMSI, that associates the identity module with a specific communication services provider.

Preferably, the memory also has stored therein executable solicitation code for requesting the provider profile. Most preferably, the executable solicitation code is adapted to be executed by the processor. Also most preferably, the executable solicitation code includes executable code for establishing a secure channel for communicating with a provider of the provider profile.

Preferably, the memory is nonvolatile.

Preferably, the executable installation code includes executable code for substituting, for a first provider profile that associates the identity module with a first communication services provider and that is already installed in the memory, a second provider profile that associates the identity module with a second communication services provider. Following the substitution, a host of the identity module communicates using the services of the second communication services provider instead of the services of the first communication services provider. Subsequently, the same executable code may be used to substitute, for the second provider profile, a third provider profile that associates the identity module with a third communication services provider, and so on. Alternatively, the executable installation code includes executable code that installs the second provider profile in the memory in addition to the first provider profile. Following the installation of the second provider profile, a host of the identity module can communicate using the services of either communication services provider.

Preferably, the memory also has installed therein executable deletion code for removing the provider profile from the memory, thereby restoring the identity module to its original condition of not being associated with a specific communication services provider.

A server for personalizing such an identity module includes a communication interface, a memory and a processor. The communication interface is for communicating with a host of the identity module. In the memory is stored executable installation code for providing to the host a customization suite that includes substantially all of the provider profile. The processor is for executing the executable installation code.

Preferably, the communication interface is an interface to a telecommunication network such as a telephony network or an internetwork.

Preferably, the executable installation code of the server is for providing the customization suite to the host contingent on satisfaction of a condition such as validation of credentials, such as a credit card number, of the entity that is requesting the customization suite.

Preferably, the server memory also has stored therein executable solicitation code for establishing a secure channel to the host for providing the customization suite to the host.

BRIEF DESCRIPTION OF THE DRAWINGS

The generic identity module is herein described, by way of example only, with reference to the accompanying drawings, wherein.

DESCRIPTION OF THE PREFERRED EMBODIMENTS

The principles and operation of a generic identity module may be better understood with reference to the drawings and the accompanying description.

Figure 3:
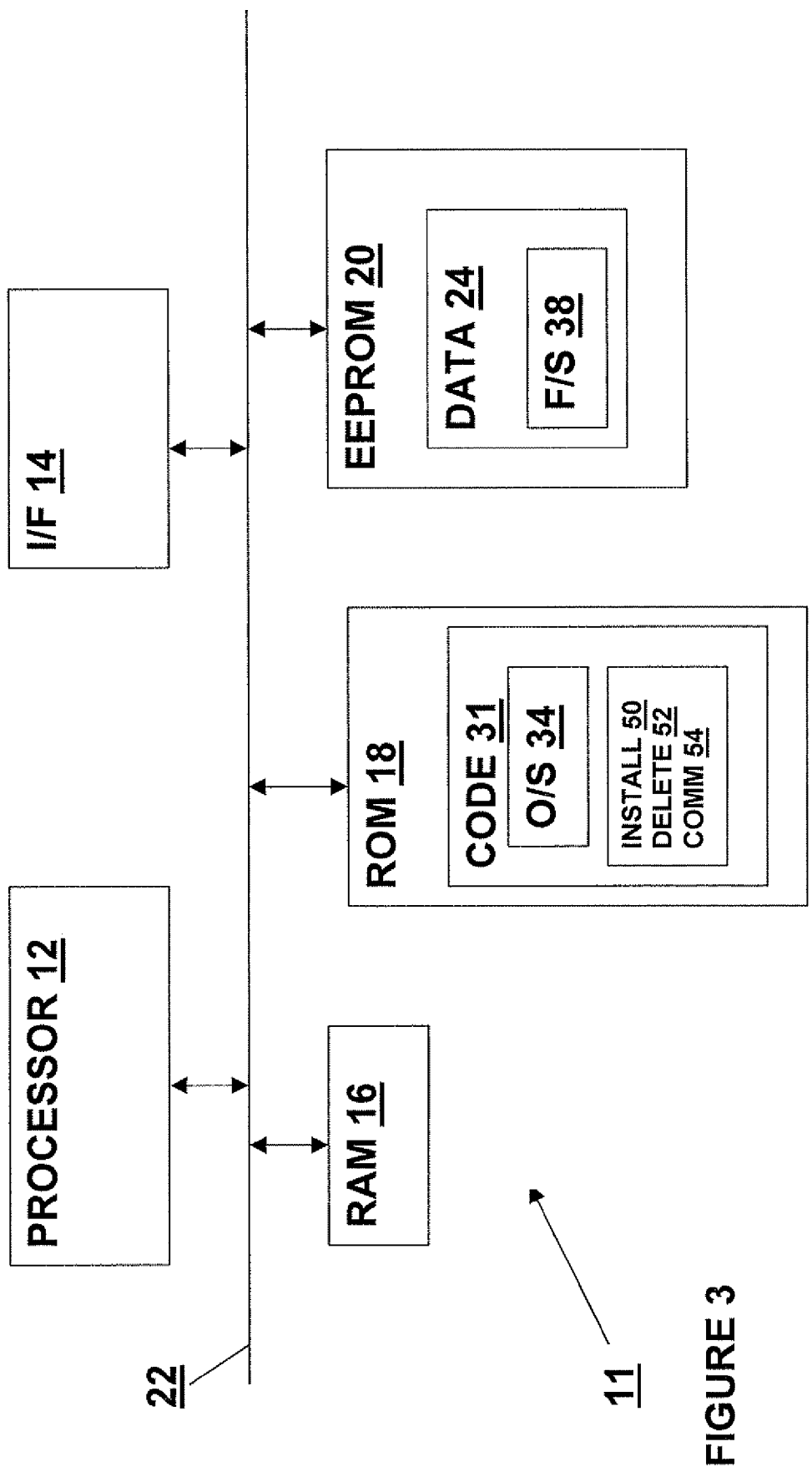
FIG. 3 is a high-level block diagram of an embodiment of a generic, pre-customization SIM.
Figure 4A:
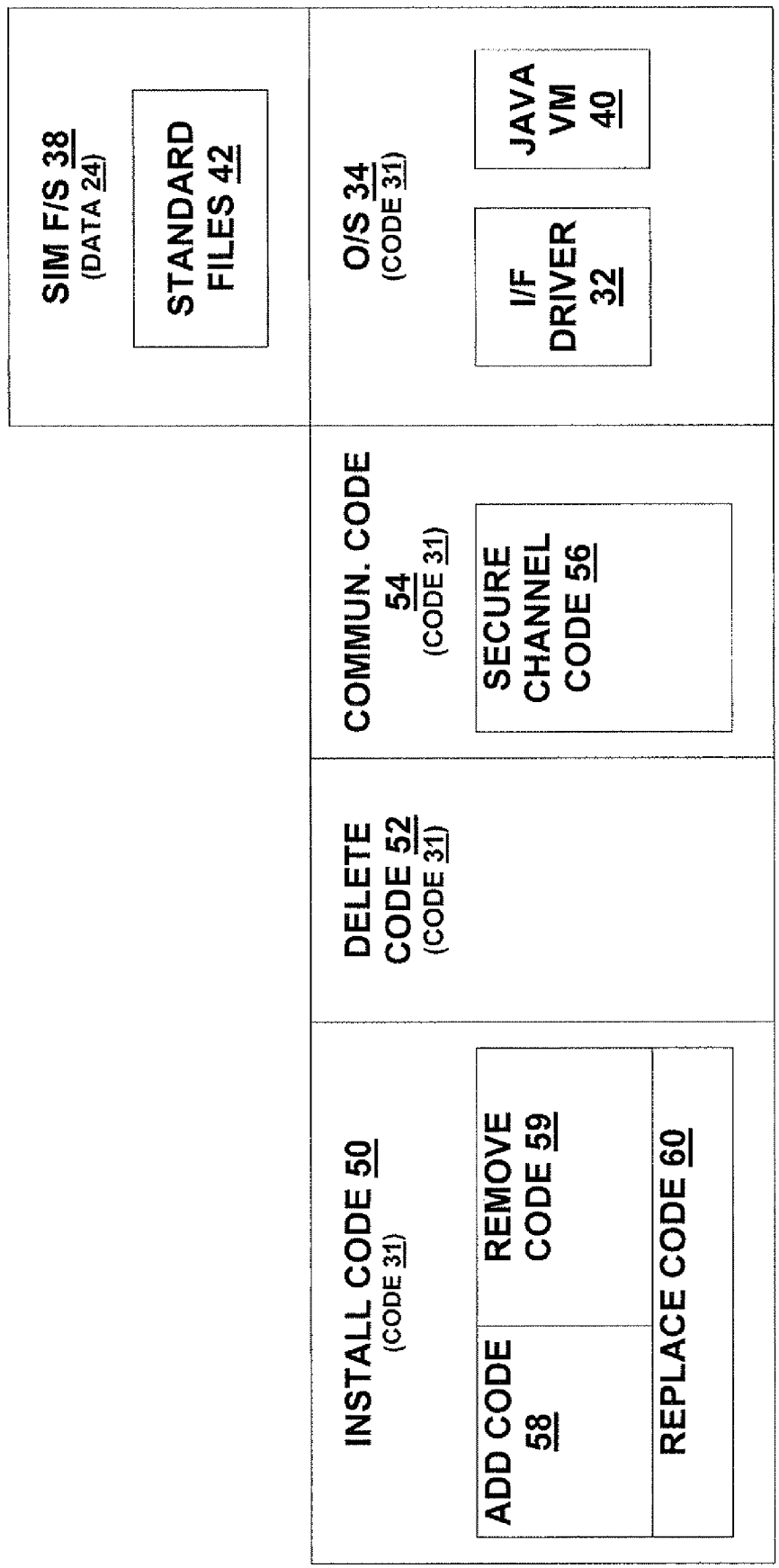
FIGS. 4A and 4C show the hierarchical architectures of the codes and data of two different generic SIMs prior to the installation of provider profiles.

Referring again to the drawings, FIG. 3 illustrates a generic SIM 11 that can be personalized at will for a user. SIM 11 is identical to SIM 10, except that code 30 is replaced with modified code 31. FIG. 4A shows the hierarchical architecture of code 31 of an exemplary embodiment of such a generic SIM and its relation to data 24.

Figure 1:
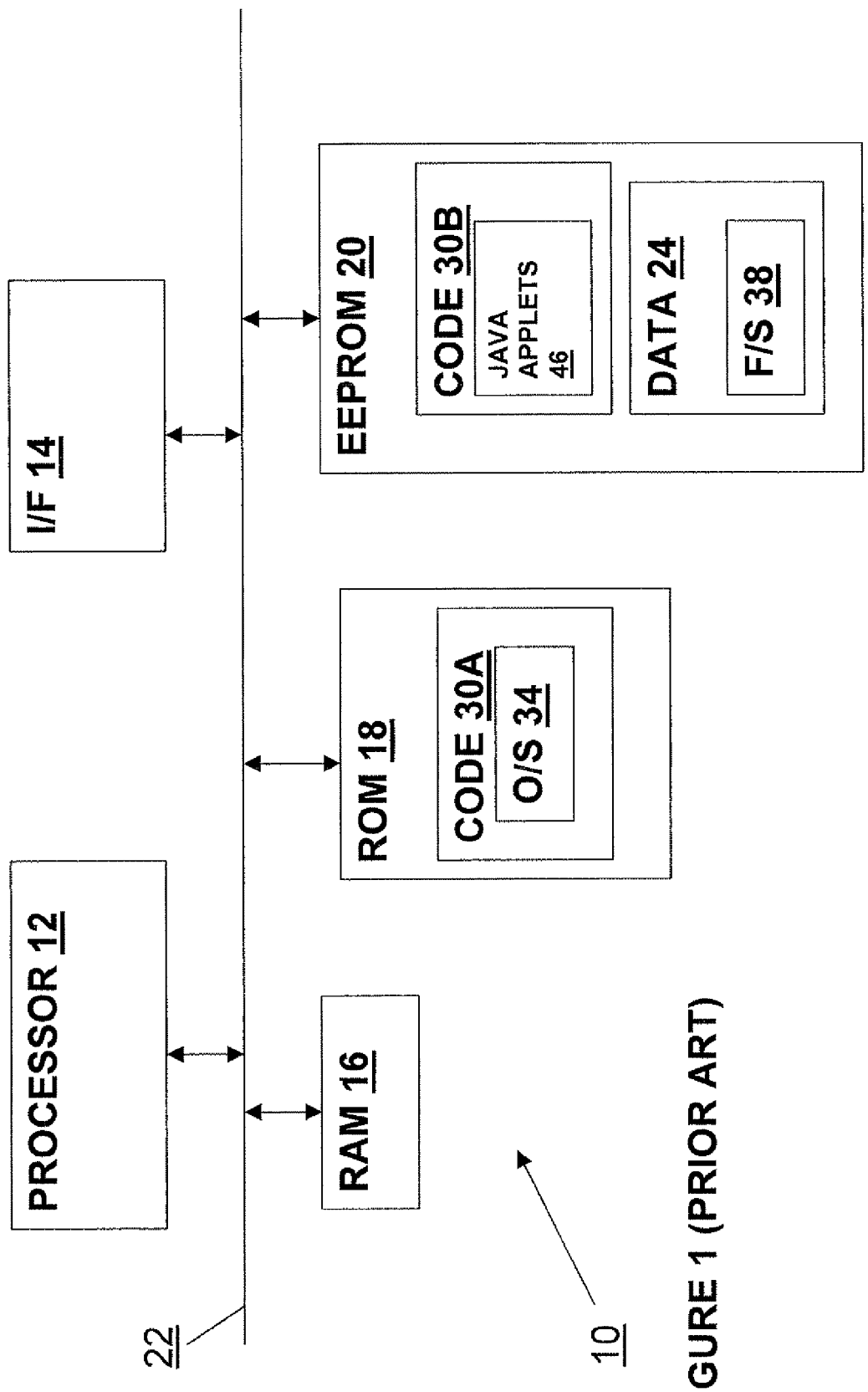
FIG. 1 is a high-level block diagram of a conventional SIM.
Figure 2:
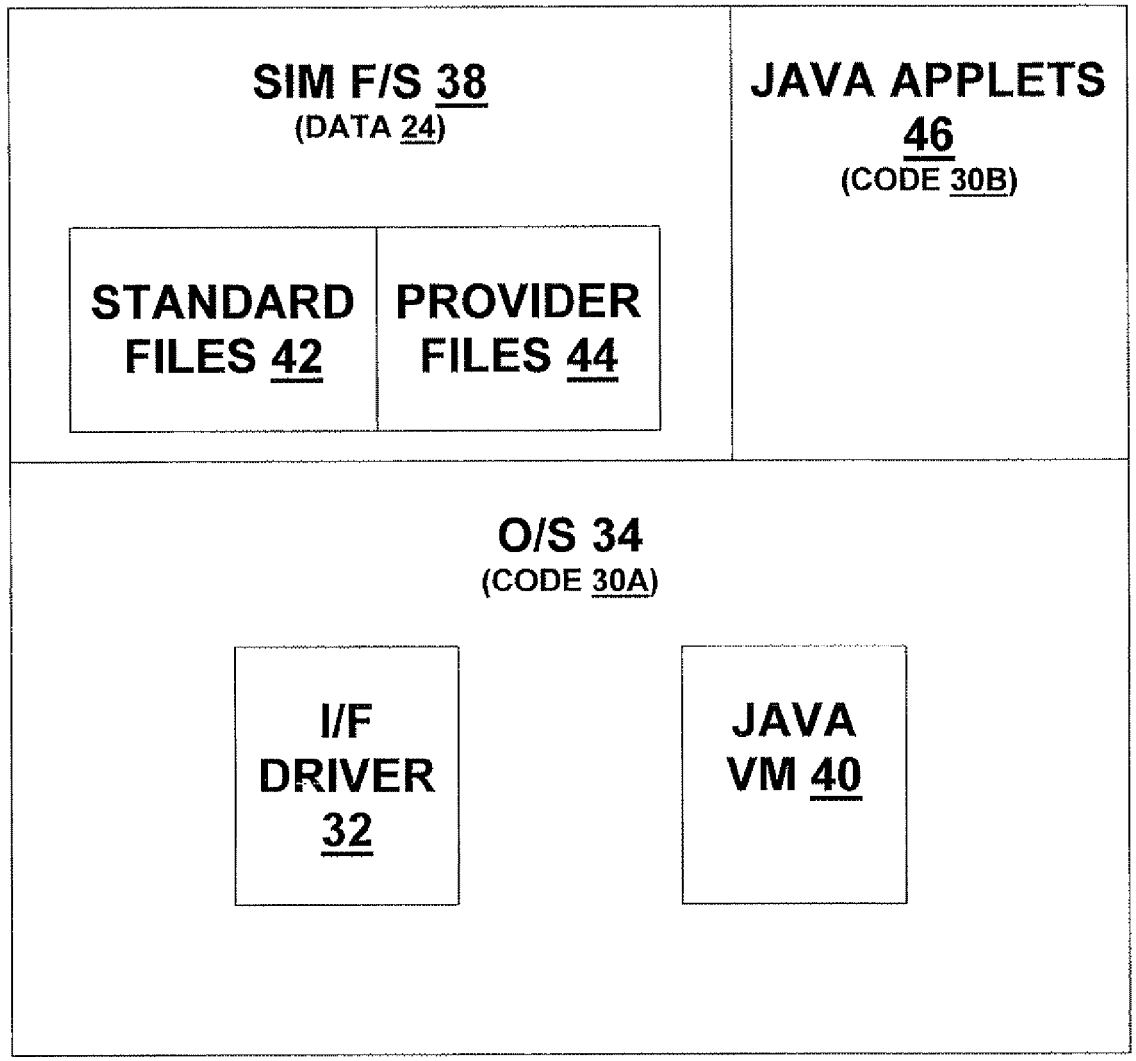
FIG. 2 shows the hierarchical architecture of the code of a conventional SIM.

Like code 30 and data 24 of FIG. 2, code 31 and data 24 of FIG. 4A includes an operating system 34 with a driver 32 of interface 14 and a JAVA virtual machine 40, and a SIM file system 38 with standard files 42 but does not include either provider-defined SIM files 44 or any JAVA applets 46. Instead, code 31 of FIG. 4A includes installation code 50 for installing, in EEPROM 20 of SIM 11, the portion of code 30 and data 24 of FIG. 2 (provider-defined files 44 and JAVA applets 46) that associates conventional SIM 10 with a specific telecommunications services provider, and also for installing, in EEPROM 20 of SIM 11, data 24 that personalize SIM 11 for a specific subscriber of the telecommunications services provider. Installation code 50 is functionally equivalent to the code that a manufacturer of SIM 10 uses to install provider-defined files 44, JAVA applets 40 and the rest of data 24 in SIM 10.

Figure 4B:
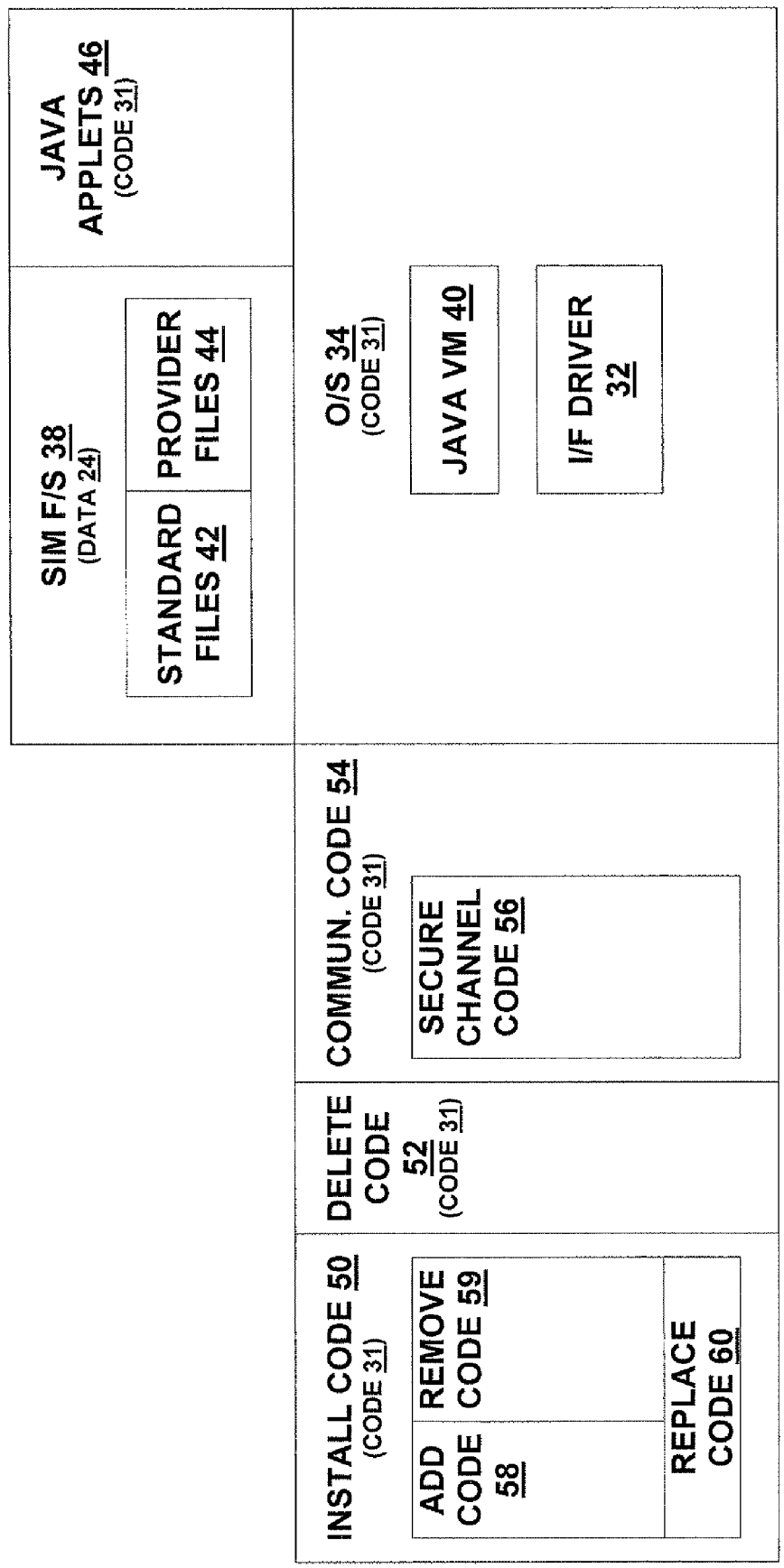
FIG. 4B shows the hierarchical architecture of the code and data of the generic SIM of FIG. 4A after the installation of a provider profile.

After processor 12 has executed installation code 50, the hierarchical architecture of code 31 and its relation to data 24 is as illustrated in FIG. 4B. Hence, provider-defined portion 44, JAVA applets 46 and the related data 24 are referred to collectively herein as a "provider profile" that associates SIM 11 with a specific subscriber of a specific telecommunications services provider.

In order to obtain the provider profile for installation, SIM 11 also includes communication code 54 that is executed by processor 12 and by a host such as a cellular telephone. While SIM 11 is installed in the host, the host executes the relevant portion of communication code 54 along with its own code to follow a data communication protocol such as GPRS to communicate with a server that is associated with the telecommunications services provider and request the provider profile.

Figure 5:
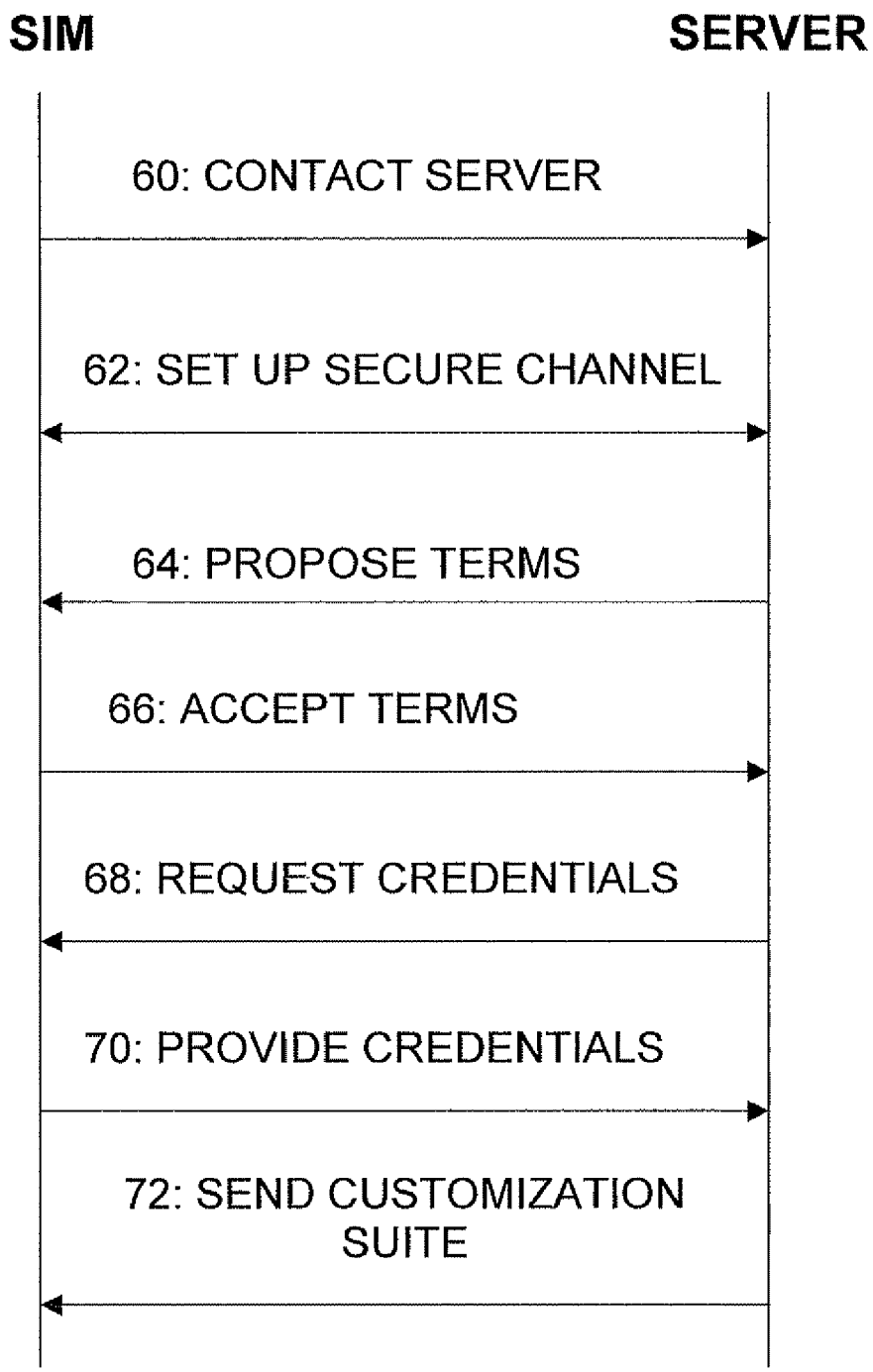
FIG. 5 shows the exchange of signals between a generic SIM and a server for requesting a provider profile.

FIG. 5 shows the exchange of signals between SIM 11 and a server for requesting a provider profile. In step 60, the user uses the cellular telephone in which SIM 11 is installed to initiate communication with the server. In step 62, SIM 11 and the server set up a secure channel for uploading user credentials to the server and downloading the provider profile to SIM 11, using methods known in the art that need not be detailed here. For that purpose, communication code 54 includes code 56 for setting up the secure channel. In step 64, the server proposes terms of usage to SIM 11. If the user decides to accept the proposed terms of usage, in step 66 the user uses the cellular telephone in which SIM 11 is installed to send a message to the server indicating acceptance of the terms of usage. In step 68, the server requests user credentials, such as a mailing address and a credit card number, for registering the user as a subscriber to the telecommunications services provider with which the server is associated. In step 70, the user uses the cellular telephone in which SIM 11 is installed to send the requested credentials to the server. In step 72, having authenticated the user credentials, the server sends a "customization suite" to SIM 11. The customization suite includes the provider-specific data (both data generic to the provider and data such as an IMSI and one or more authentication keys that are specific to SIM 11) that SIM 11 needs for executing installation code 50 to install the provider profile. Optionally, the customization suite also includes provider-specific instructions (e.g. in the form of a script) that supplement installation code 50. Processor 12 executes communication code 54 to effect the SIM-11-side portion of the provider profile request.

Figure 6:
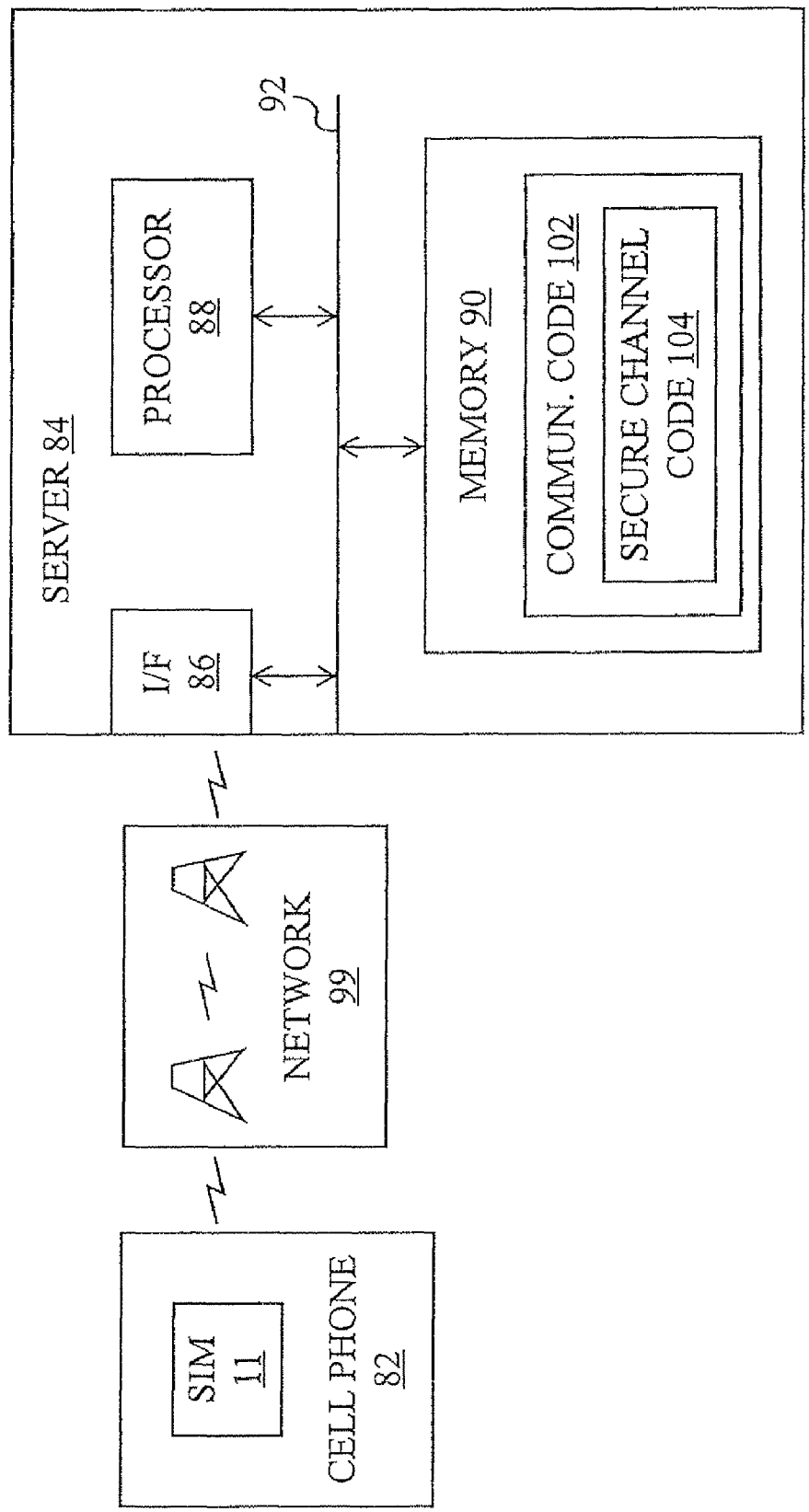
FIG. 6 is a high-level block diagram of a generic SIM in a cellular telephone requesting a provider profile from a server.

FIG. 6 shows SIM 11, installed in a cellular telephone 82, communicating with a server 84 via a cellular telephony network 94 to effect the steps illustrated in FIG. 5. Server 84 includes, among other components, an interface 86 to network 94, a memory 90 wherein is stored code 102 for implementing the server-side steps of FIG. 5, and a processor 88 for executing code 102. Interface 86, memory 90 and processor 88 communicate with each other via a bus 92. Code 102 includes, inter alia, secure channel code 104 that is similar to secure channel code 56.

FIGS. 4A and 4B also show code 31 of a generic SIM 10 as including deletion code 52 and as including, in installation code 50; a module 58 for adding to SIM 11 a second provider profile of a second telecommunications services provider (in addition to a first provider profile of a first telecommunications services provider that is already installed in SIM 11); a module 59 for deleting a provider profile from SIM 11; and a module 60 for substituting in SIM 11 a second provider profile of a second telecommunications services provider for a first provider profile of a first telecommunications services provider (that is already installed in SIM 11).

In some embodiments of a generic SIM 11, modules 58, 59 and 60 may be absent and deletion code 52 may be executed automatically, upon the successful completion of personalization of SIM 11, to delete installation code 50, communication code 54 and deletion code 52 itself. Subsequent to such deletion, the hierarchical structure of code 31 then is the same as that of code 30 of the prior art, as illustrated in FIG. 2. In other embodiments of a generic SIM 11, the execution of deletion code 52 may be optional.

Figure 7:
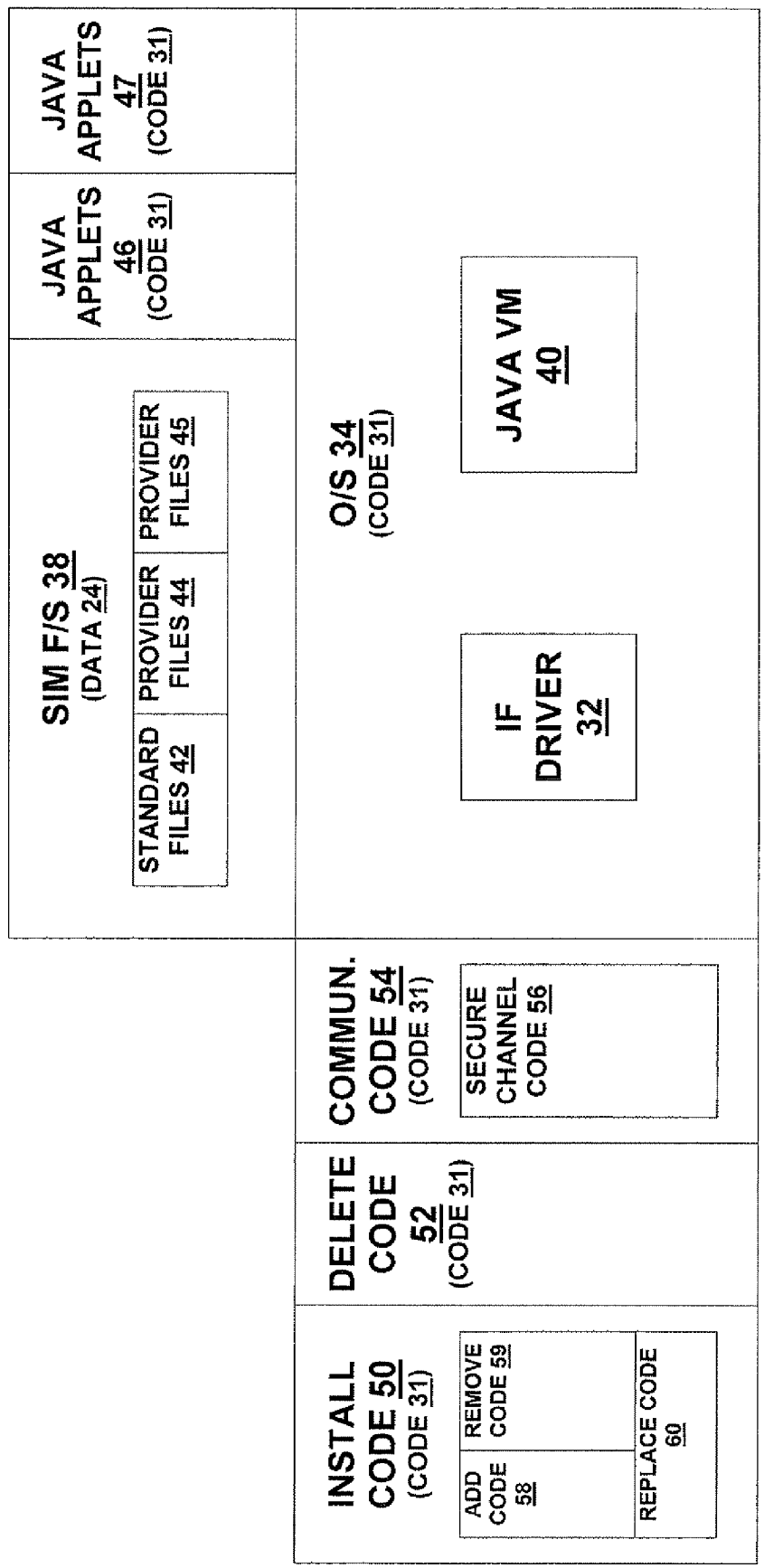
FIG. 7 shows the hierarchical architecture of the code and data of a generic SIM after the installation of two provider profiles.

Module 58 gives the user the option of subscribing to two or more different telecommunications services providers at the same time. Executing module 58 effects the steps illustrated in FIG. 5 to add a second provider profile to SIM 11. The hierarchical architecture of code 31 after such an addition is illustrated in FIG. 7. In addition to files 44 and JAVA applets 46 that are specific to the first telecommunications provider, code 31 and data 24 now include files 45 and JAVA applets 47 of the second telecommunications provider. Module 59 gives the user the option of deleting any or all of the installed provider profiles from SIM 11. Module 60 gives the user the option of substituting the provider profile of a second telecommunications provider for the provider profile of a first telecommunications provider. Executing module 60 executes module 59 to delete an installed provider profile and then effects the steps illustrated in FIG. 5 to install the new provider profile.

Server 84 of FIG. 6 may be owned either by the manufacturer of generic SIM cards 11 or by a telecommunications services provider. If server 84 is owned by the manufacturer of generic SIM cards 11 then server 84 provides subscription services for telecommunications services providers that have made the appropriate arrangements with the manufacturer of generic SIM cards 11. In step 60 of FIG. 5, in addition to calling server 84, the user also specifies which telecommunications services provider the user wishes to subscribe to. In step 72 of FIG. 5, in addition to sending the user the provider profile, server 84 also sends the user's credentials to the selected telecommunications services provider, via cellular telephony network 94. If server 84 is owned by a telecommunications services provider, for example if the manufacturer of generic SIM cards 11 has sold server 84 to the telecommunications services provider, then in step 70 of FIG. 5, upon receiving the user's credentials, the telecommunication services provider sets up an account for the user.

Figure 4C:
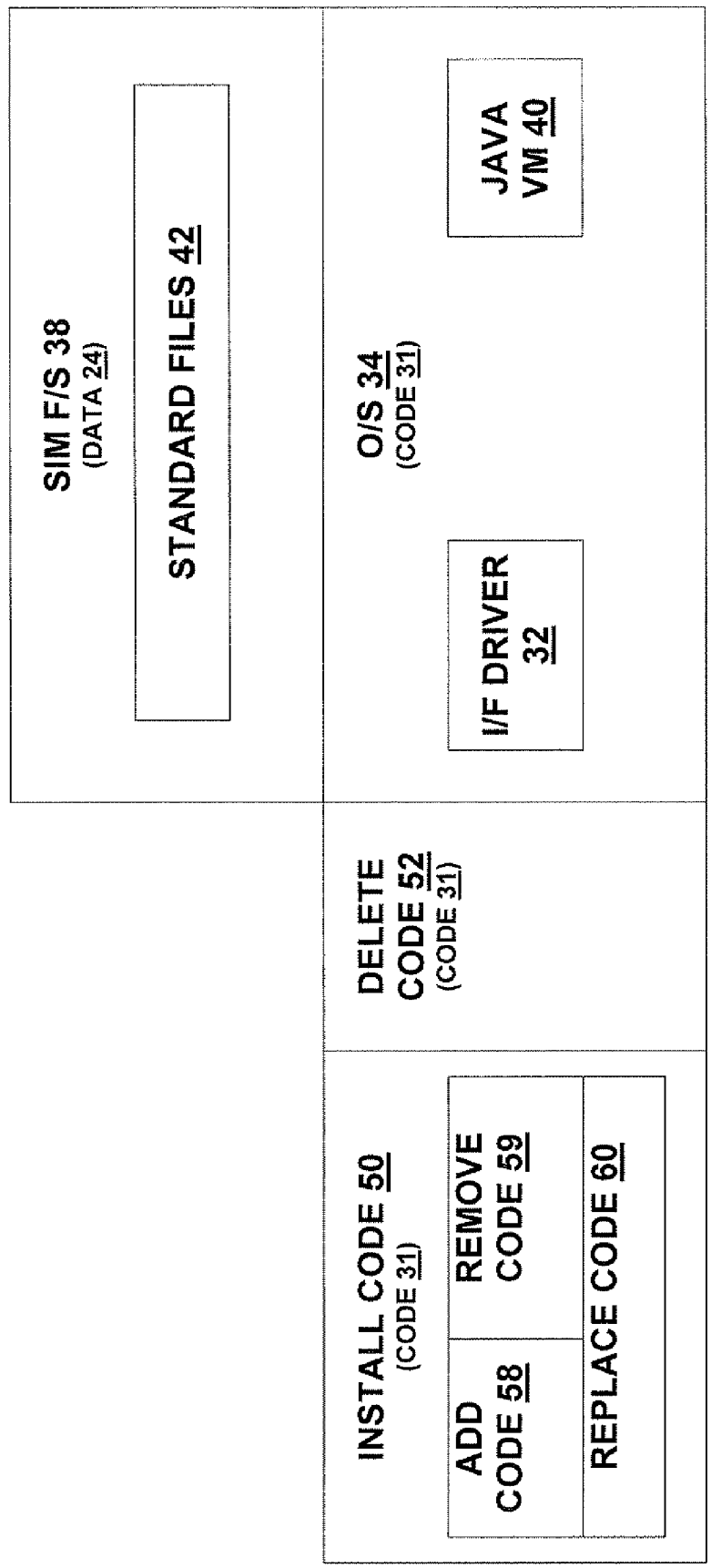
Figure 8:
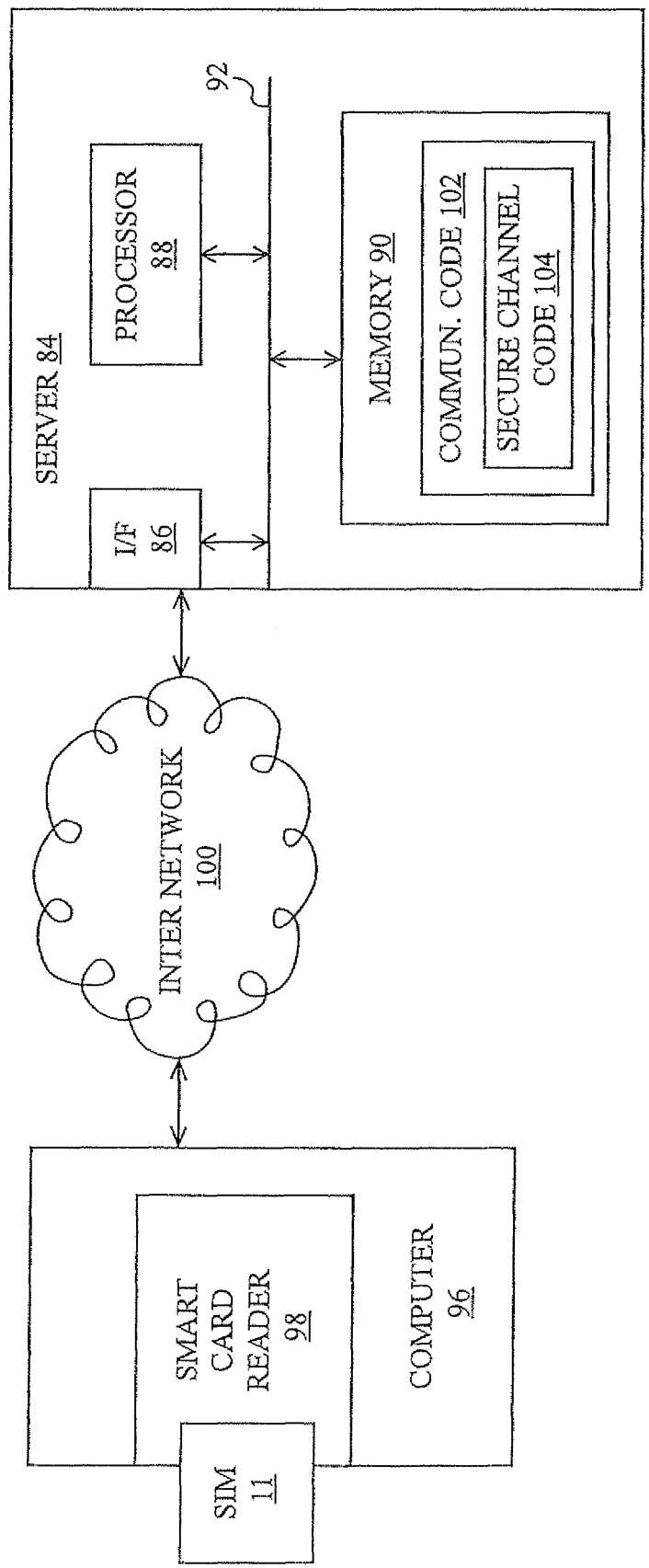
FIG. 8 is a high-level block diagram of a generic SIM coupled by a card reader to a computer requesting a provider profile from a server.

FIG. 8 shows an alternative mechanism for establishing communication between SIM 11 and server 84. In FIG. 8, the host of SIM 11 is a computer 96 equipped with a smart card reader 98 to which SIM 11 is operationally coupled via its interface 14. Computer 96 communicates with server 84 via an internetwork 100 such as the Internet. Computer 96 would be used, for example, by a retail vendor of generic smart cards 11 who offers generic smart cards 11 for sale to users and who personalizes generic smart cards 11 for users who purchase generic smart cards 11. The manufacturer of generic smart cards 11, in turn offers generic smart cards 11 for sale to such retail vendors, instead of or in addition to offering conventional SIMs 10 for sale to telecommunications services providers. Optionally, code 54 for communicating with server 84 resides in computer 96 rather than in generic smart cards 11; the corresponding hierarchical architecture of code 31 of such a generic smart cards 11 is shown in FIG. 4C.

Yet another mechanism (not illustrated) for establishing communication between SIM 11 and server 84 may be a blend of the two mechanisms illustrated in FIGS. 6 and 8. In this mechanism, cell phone 82 communicates with server 84 via computer 96, using e.g. USB to communicate with computer 96.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An identity module comprising:
   a memory with executable solicitation code for requesting a first provider profile from a server and with installation code for installing the first provider profile in the memory, wherein the first provider profile associates the identity module with a first communication services provider, wherein only after installation of the first provider profile the identity module contains data correlating the identity module and the first communication services provider; and
   a processor, wherein the processor is operative to:
   receive terms of usage from the server prior to downloading a customization suite that includes provider-specific data, wherein execution of the installation code is conditioned on access to the provider-specific data, and wherein the server is associated with the first communication services provider;
send an indication of acceptance of the terms of usage to the server; and
download the customization suite including the provider-specific data from the server conditioned on sending the indication of the acceptance of the terms of usage to the server.

2. The identity module of claim 1, wherein the executable solicitation code includes executable code to establish a secure channel with the server.

3. The identity module of claim 1, wherein the installation code includes executable code to replace the first provider profile with a second provider profile that associates the identity module with a second communication services provider.

4. The identity module of claim 1, wherein the memory is further to store executable code to install in the memory a second provider profile that associates the identity module with a second communication services provider.

5. The identity module of claim 1, wherein the memory is further to store executable deletion code to remove the first provider profile from the memory.

6. The identity module of claim 1, wherein the memory stores communication code for communicating with the server and for downloading the first provider profile from the server, and wherein the identity module is devoid of the first provider profile prior to downloading the first provider profile from the server.

7. The identity module of claim 1, wherein the processor is operative to request a download of the first provider profile by executing the executable solicitation code.

8. The identity module of claim 1, wherein the processor is operative to install the first provider profile after the first provider profile is downloaded, wherein the first provider profile is installed using the provider-specific data in the customization suite downloaded from the server.

9. A computer readable medium storing processor-executable instructions that when executed by a processor, cause the processor to:
receive terms of usage from a server prior to downloading a customization suite, wherein the processor is operable to execute installation code upon access to provider-specific data included in the customization suite, and wherein the installation code enables installation of a provider profile in an identity module;
download the customization suite from the server conditioned on indicating to the server an acceptance of the terms of usage;
execute solicitation code to request download of the provider profile;
download the provider profile in response to requesting the download of the provider profile; and
execute the installation code using the provider-specific data included in the downloaded customization suite to install the provider profile in the identity module,
wherein only after installation of the provider profile the identity module contains data correlating the identity module and a communication services provider associated with the server.

10. The computer readable medium of claim 9, wherein the customization suite is received via a cellular network.

11. A method of accessing a communication service by a system including a host, the method comprising:
when the host is coupled to an identity module having a non-volatile memory:
issuing a request by the host to receive a customization suite, the customization suite including provider-specific data enabling a processor of the identity module to execute installation code that enables installation of a provider profile in the identity module, wherein only after installation of the provider profile the non-volatile memory contains data correlating the identity module and a provider of the communication service;
in response to issuing the request, receiving at the host terms of usage associated with the communication service from a server that is associated with the provider of the communication service;
providing, by the host to the server, an indication of acceptance of the terms of usage; and
receiving the customization suite at the host conditioned on the host having provided the indication of acceptance of the terms of usage.

12. The method of claim 11, further comprising, prior to receiving the customization suite at the host, providing user credentials from the host to the provider of the communication service.

13. The method of claim 12, wherein the customization suite is received at the host in response to the user credentials provided by the host having been authenticated.

14. The method of claim 11, wherein the request to receive the customization suite is issued via a cellular network.

15. The method of claim 11, wherein the request to receive the customization suite is issued via a data network.

16. The method of claim 11, further comprising establishing a secure connection at the host with a provider of the customization suite by executing solicitation code prior to receiving the customization suite.

17. The method of claim 11, wherein prior to installing the provider profile using the provider-specific data the identity module is devoid of the provider profile and the identity module is unable to utilize services offered by the provider of the communication service.

18. A method of establishing access to a communication service by a host, the method comprising:
requesting access to the communication service by the host;
receiving at the host, terms of usage of a provider of the communication service in response to the requested access;
submitting an indication of acceptance of the terms of usage by the host; and
in response to submitting the indication of acceptance of the terms of usage, receiving a customization suite at the host, wherein the customization suite includes provider-specific data that enables a processor of an identity module to execute installation code to install a provider profile into a non-volatile memory of the identity module when the identity module is operationally coupled to the host, wherein only after installation of the provider profile the non-volatile memory contains data correlating the identity module and the provider of the communication service; and
executing solicitation code to request download of the provider profile.

19. The method of claim 18, further comprising:
downloading the provider profile after executing the solicitation code; and
installing the provider profile in the identity module via the installation code using the provider-specific data in the customization suite after the customization suite has been received at the host.

20. The method of claim 18, wherein prior to the installation of the provider profile the identity module is unable to utilize services offered by the provider of the communication service.

* * * * *